US010789696B2

(12) United States Patent
Po et al.

(10) Patent No.: US 10,789,696 B2
(45) Date of Patent: Sep. 29, 2020

(54) PATCH SELECTION FOR NEURAL NETWORK BASED NO-REFERENCE IMAGE QUALITY ASSESSMENT

(71) Applicant: TFI Digital Media Limited, Hong Kong (HK)

(72) Inventors: Lai Man Po, Hong Kong (HK); Mengyang Liu, Hong Kong (HK); Yiu Fai Yuen, Hong Kong (HK); Yuming Li, Beijing (CN); Xuyuan Xu, Shenzhen (CN); Chang Zhou, Hong Kong (HK); Hon Wah Wong, Hong Kong (HK); Kin Wai Lau, Hong Kong (HK); Hon Tung Luk, Hong Kong (HK); Hok Kwan Cheung, Hong Kong (HK)

(73) Assignee: TFI DIGITAL MEDIA LIMITED, Hong Kong (HK)

( * ) Notice: Subject to any disclaimer, the term of this patent is extended or adjusted under 35 U.S.C. 154(b) by 239 days.

(21) Appl. No.: 15/987,930

(22) Filed: May 24, 2018

(65) Prior Publication Data
US 2019/0362484 A1 Nov. 28, 2019

(51) Int. Cl.
*G06T 7/00* (2017.01)
*G06N 3/08* (2006.01)
*G06N 5/04* (2006.01)

(52) U.S. Cl.
CPC .............. *G06T 7/0002* (2013.01); *G06N 3/08* (2013.01); *G06N 5/046* (2013.01); *G06T 2207/30168* (2013.01)

(58) Field of Classification Search
CPC ......... G06T 7/0002; G06T 2207/30168; G06T 2207/20084; G06T 2207/20081; G06N 3/08; G06N 5/046; G06N 3/082; G06N 3/0454
See application file for complete search history.

(56) References Cited

U.S. PATENT DOCUMENTS

| 9,122,960 | B2 * | 9/2015 | Lin | G06K 9/68 |
| 9,607,384 | B2 * | 3/2017 | Docherty | G02B 21/367 |
| 9,900,474 | B2 * | 2/2018 | Fukase | H04N 1/6041 |
| 10,423,855 | B2 * | 9/2019 | Cameron | G06K 9/6221 |
| 10,572,979 | B2 * | 2/2020 | Vogels | G06K 9/623 |

(Continued)

*Primary Examiner* — Xuemei G Chen
(74) *Attorney, Agent, or Firm* — Idea Intellectual Limited; Margaret A. Burke; Sam T. Yip

(57) ABSTRACT

The present disclosure relates to a method for image patch selection for training a neural network for image quality assessment. The method includes receiving an input image and extracting one or more image patches from the input image. The moment of the extracted image patches is measured. There is a decision to accept or decline the extracted image patches according to the measured moment. Additional image patches are extracted until a minimum number, $N_{min}$, of extracted image patches are accepted. Alternatively, selection criteria are adjusted until the minimum number of extracted image patches are accepted. The selected image patches are input into a neural network with a corresponding image quality value of the input image, and the neural network is trained with the image patches and image quality value. Also provided is a method for image quality assessment using a neural network trained as set forth above.

19 Claims, 3 Drawing Sheets

(56) References Cited

U.S. PATENT DOCUMENTS

| | | | | |
|---|---|---|---|---|
| 2009/0315910 | A1* | 12/2009 | Kambhamettu | G06T 11/00 345/589 |
| 2010/0322489 | A1* | 12/2010 | Tizhoosh | G06K 9/6253 382/128 |
| 2013/0315487 | A1* | 11/2013 | Turetzky | G06T 19/006 382/195 |
| 2016/0282598 | A1* | 9/2016 | Besley | G02B 21/22 |
| 2017/0078636 | A1* | 3/2017 | Cho | H04N 1/6027 |
| 2017/0351941 | A1* | 12/2017 | Mishra | G06N 3/0454 |
| 2018/0018451 | A1* | 1/2018 | Spizhevoy | G06K 9/00617 |
| 2018/0047159 | A1* | 2/2018 | Schlegl | G06K 9/6267 |
| 2018/0114317 | A1* | 4/2018 | Song | G06K 9/6269 |
| 2019/0096032 | A1* | 3/2019 | Li | G06T 3/4007 |
| 2019/0164008 | A1* | 5/2019 | Yahata | G06K 9/40 |
| 2019/0164288 | A1* | 5/2019 | Wang | G06T 7/0014 |
| 2019/0199948 | A1* | 6/2019 | Kim | H04N 5/3597 |
| 2019/0236411 | A1* | 8/2019 | Zhu | G06K 9/4628 |
| 2019/0286936 | A1* | 9/2019 | Fuchs | G06K 9/62 |
| 2019/0318189 | A1* | 10/2019 | Xu | G06K 9/00449 |
| 2019/0332896 | A1* | 10/2019 | Liang | G06K 9/6263 |
| 2019/0355147 | A1* | 11/2019 | Li | G06F 3/011 |

* cited by examiner

PATCH SELECTION FOR NEURAL NETWORK BASED NO-REFERENCE IMAGE QUALITY ASSESSMENT

FIELD OF THE INVENTION

The present invention relates to the selection of image patches for training of neural networks and assessing image quality via neural networks by using high variance image patches.

BACKGROUND

During the last three decades, the volume of digital image data has been growing at an explosive pace due to the rapid development of multimedia and improved networking technologies. Each hour, a massive number of digital images is generated, making image quality assessment (IQA) a popular subject for both academic and industrial investigation. According to the dependency of reference images, IQA methods are usually divided into 3 types: full-reference IQA (FR-IQA), reduced-reference IQA (RR-IQA) and no-reference IQA (NR-IQA). FR-IQA and RR-IQA metrics assume that all or partial reference image information is available, and do a comparison between a reference image and a tested image. PSNR, SSIM, FSIM, IFC and VIF are well-known FR-IQA algorithms. However, since the reference image is not always available, NR-IQA has become more desirable for practical applications; many NR-IQA algorithms have been developed. The first generation of those algorithms were calibrated to some specific distortions such as JPEG, JPEG2000, and H.264/AVC. These algorithms are difficult to generalize for other new distortion types. The second-generation NR-IQA algorithms focus on the investigation of natural scene statistics (NSS) and use handcrafted features that supposedly capture relevant factors affecting image quality. Well-known NSS-based algorithms are DIIVINE, BLIINDS-II, and BRISQUE.

In recent years, deep learning has proven to perform well on a wide range of problems. The rise of deep learning had also revolutionized NR-IQA development as a data-driven approach, which learns discriminative features directly from raw image patches. Pioneer works using this approach are CORNIA and CNN-NRIQA. CORNIA aims at training image representation kernels directly from raw image pixels using unsupervised feature learning while CNN-NRIQA integrates feature learning and regression into one optimization process using a Convolutional Neural Network (CNN).

Kang et al., "Convolutional Neural Networks for No-Reference Image Quality Assessment." In *Computer Vision and Pattern Recognition (CVPR)*, 2014, pp. 1733-1740 describe the application of CNN to NR-IQA. In this paper, Kang et al. proposed a very meaningful framework and achieved excellent results. This approach mainly dealt with small image patches (such as 32×32 pixels) and the whole image quality score is the average predicted scores of the small test patches. However, Kang's CNN-NRIQA network only contains one convolution layer, which is too shallow. Thus, a complete image with a size of 224×224 pixels were used by later researchers to train deep CNNs with many layers for handling issues relating to the fact that the small patch problem cannot match human perception. Other researchers applied existing deep CNNs to fine-tune the parameters. In addition, CNNs designed for small patches with weight adjustment for each patch have been proposed. Recently, a pre-saliency map (pre-SM) based NR-IQA method via CNN was proposed. It was demonstrated that prediction error of the image patches in saliency regions is, on average, lower than that in homogenous regions using a fast saliency map (SM) model. Based on this result, a pre-SM algorithm adaptively applies CNN computation on image patches and assigns higher weights for salient patches in the whole score estimation. This technique can achieve high accuracy with subjective quality scores. However, SM calculation is required in the image quality estimation process even when the fast SM model is used.

Thus, there is a need in the art for improved image quality assessment and, more particularly, for improved training input for neural networks to learn image quality assessment.

SUMMARY OF THE INVENTION

The present disclosure relates to a method for image patch selection for training a neural network for image quality assessment. The method includes: receiving an input image and extracting one or more image patches from the input image. The moment of the extracted image patches is measured. There is a decision to accept or decline the extracted image patches according to the measured moment. Additional image patches are extracted until a minimum number, $N_{min}$, of extracted image patches are accepted. Alternatively, selection criteria are adjusted until the minimum number of extracted image patches are accepted. The selected image patches are input into a neural network with a corresponding image quality value of the input image, and the neural network is trained with the image patches and image quality value.

The invention further provides a method for image quality assessment using a trained neural network, including receiving an input image and selecting image patches from the input image for assessment. The image patches are selected by extracting one or more image patches from the input image, measuring the moment of the extracted image patches, and deciding to accept or decline the extracted image patches according to the measured variance and the position of extracted image patches. One or more weights of the accepted image patches are determined according to the measured moment. The image patch selection process is repeated until sufficient extracted image patches are accepted, with adjusted settings if necessary. The success conditions are: the measured moment of all accepted image patches is greater than a threshold moment value; the number of image patches accepted is larger than a minimum threshold number; the minimum distance between the centers of any image patches is larger than or equal to a minimum threshold value. The selected image patches are input into the trained neural network to obtain the image quality values of the selected image patches. The image quality value of the input image is determined according to the image quality values of the selected image patches and the corresponding weights.

The present invention also provides a possible way of adjusting the parameters during the image patch selection process: selecting an initial stride as the initial minimum possible distance for the extracted image patches; scanning the image with the stride to generate N image patches based on the threshold variance $T_{var}$; if N is not greater than or equal to the minimum number of patches ($N_{min}$), repeat the scanning with a reduced stride until N is greater than or equal to $N_{min}$.

DETAILED DESCRIPTION

Figures 1, 2:
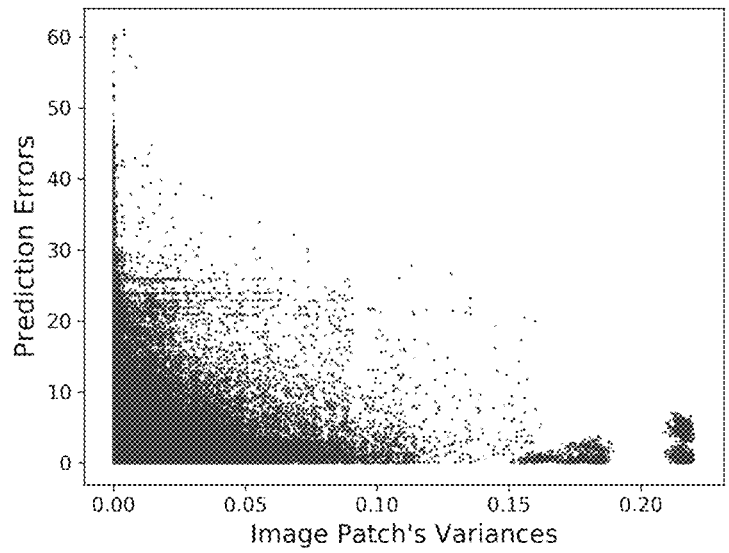
FIG. 1 depicts the overall architecture of a neural network used in a method embodiment.
FIG. 2 is a scatter plot of image patch quality score prediction errors vs. image patch variances.

In the following description, methods and systems for the image patch selection process for training neural network for image quality assessment and assessment methods via trained neural network are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

In one embodiment, the method for image patch selection for training a neural network for image quality assessment comprises: inputting an image; extracting one or more image patches randomly from the input image; measuring the moment of the extracted image patches; deciding accept or decline extracted image patches according to the measured moment; repeating the image patches selection process until sufficient extracted image patches are accepted, with adjusted settings if necessary. After the image patch selection process, the extracted image patches are input into the neural network with a corresponding image score from the input image. Then the neural network is trained with the image patches and the corresponding quality score.

In neural network-based NR-IQA, small image patches are used to train a neural network. In previous approaches, patches are randomly sampled during the training from the training images with quality labels set to the score of the source image. Moreover, each patch is treated as an independent sample. After training, the network is used to estimate individual patch's score that is scanned from the tested image. The whole image quality score is based on the weighted sum of predicted scores of the sampled patches from the tested image. Thus, the accuracy of the final score is highly dependent on the individual patch quality score estimation.

In making the present invention, the inventors determined that the main drawback of using small image patches is that not every patch has the same amount of information. Normally, homogenous patches from flat or smooth regions have relatively lower accuracy as compared with non-homogenous patches that include strong edges or complex textures. This is because homogenous regions of high and low-quality images are typically very similar in most real-world images. Thus, very similar homogenous patches may come from both high and low-quality images. As a result, similar homogenous patches have relatively higher chances to be assigned with very different quality labels during the neural network training process. These low-quality training data will confuse the network during the training process. In addition, the trained network will also be unreliable for homogenous patch quality score estimation.

Based on this discovery by the inventors, the present invention determined to use patch moment, particularly the moment of the second order, that is, the variance of the image patches as an indicator of homogeneity for performing image patch quality score prediction error analysis. Pixel variance is a measure of how much each pixel varies from a neighboring pixel or center pixel and gives an indication of the amount of information conveyed. The patch variance is defined as the average pixel value variances of a selected patch in RGB color channels, which can be expressed as $$\text{var}_{ave}(P) = \frac{1}{3}[\text{var}_R(P) + \text{var}_G(P) + \text{var}_B(P)] \quad (1)$$

where $\text{var}_R(P)$, $\text{var}_G(P)$ and $\text{var}_B(P)$ are variances of pixel values in RGB color channels, respectively. The reason to use patch variance as homogeneity indicator is because homogenous patches normally have very low variances in pixel values.

A neural network was selected to be trained using data selected according to equation 1. The selected network, depicted in FIG. 1, was a convolutional neural network although other types of neural networks may be used. In particular, the selected convolutional neural network is a CNN-based NR-IQA network The network of FIG. 1 includes 12 convolutional layers with max-pooling between every 2 convolutional layers. Except for the last fully-connected layer, all layers are activated by the ReLU activation function. Zero-padding and 3×3 kernels are used in all convolutional layers. Dropout regularization is added after layer 11 with 0.5 ratio and MAE loss function is used with 0.0001 learning rate for ADAM optimizer.

Images used for patch selection were taken from the LIVE database. 80% images of LIVE database were selected for training and the remaining 20% were selected for testing. In addition, we densely sampled 70,650 image patches from the test set for quality score prediction error analysis. The scatter plot of these patches in terms of image quality score prediction errors against image patch variances is shown in FIG. 2. It can be easily observed that the prediction errors for patches with very low variances are not reliable for quality score estimation as their prediction errors are widely spread out. In contrast, the prediction errors distribution for patches with high variances are distributed on the much lower prediction error regions.

Figure 3:
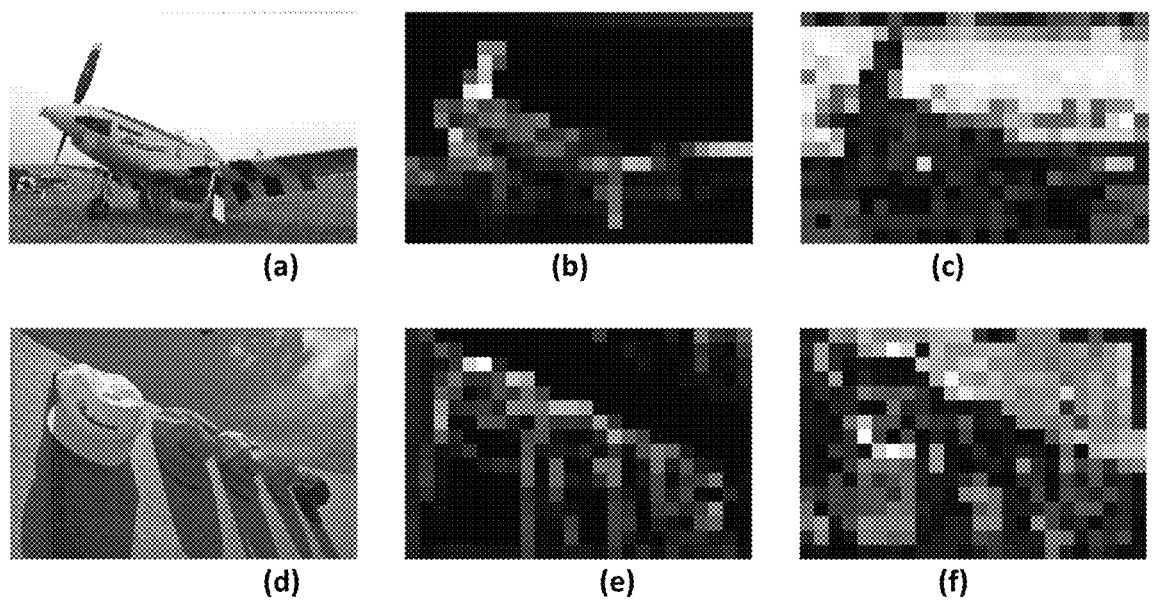
FIG. 3 depicts image examples and their corresponding patch variances and quality score prediction errors.

To further visualize this phenomenon, two images from the test set with their correspondent patch variances and quality score prediction errors are shown in FIG. 3. The homogenous regions of these two images have very low patch variances, which correspond to the dark regions of FIGS. 3(*b*) and 3(*e*). The dark regions of FIGS. 3(*b*) and 3(*e*) correspond to bright regions in FIGS. 3(*c*) and 3(*f*), which indicates that homogenous regions create relatively higher prediction errors. These examples further demonstrate that image patches with very low patch variances are not reliable for estimating the whole image quality score. Therefore, in addition to using training patches with a high variance, the overall image quality score should also be biased towards patches with higher variances.

Based on the above findings, the use of homogenous patches during neural network training and quality score estimation is avoided. To enhance the performance of the conventional CNN-based NR-IQA, we propose to use a variance threshold to avoid using these low-quality data in both neural network training and image quality estimation.

In addition, we also propose to use variance-based weighting for calculating the whole image quality score.

The method for patch sampling is based on variance threshold. To avoid homogeneous patches for neural network training, the inventors have modified the image patch sampling strategy. The method comprises: Input M training images; randomly sample a m×m patch from input training images; calculate the patch variance based on the equation 1; select a patch which is greater than a predefined variance threshold ($T_{var}$); keep the selected image patch and corresponding image score; repeat the patch sampling process until sufficient image patches (N) are sampled; and feeding all the M*N selected image patches and score pairs to the CNN model for training. In the experiment, the LIVE database is used for training the selected CNN model. M is set to 32 and N is set to 32 in order to balance the number of patches in each epoch and the data richness in the LIVE database.

| Patch Sampling based on Variance Threshold |
|---|
| Input: Images from training set with M images $\{I_1, I_2, \ldots, I_M\}$<br>while i ∈ [1, M] do<br>  j = 0;<br>  while j < N do<br>  Randomly sample a m × m patch P from $I_i$;<br>  Calculate the patch variance of P:<br>  $var_{ave}(P) = [var_R(P) + var_G(P) + var_B(P)]/3$<br>  if $var_{ave}(P) \geq T_{var}$ then:<br>    Keep this patch as $[P_{i,j}, Q_{i,j}]$;<br>    j = j+1;<br>  end if<br>  end while<br>end while<br>Shuffle the M·N patch/score pairs;<br>Feed them to the CNN model for one epoch of training; |

Figure 4:
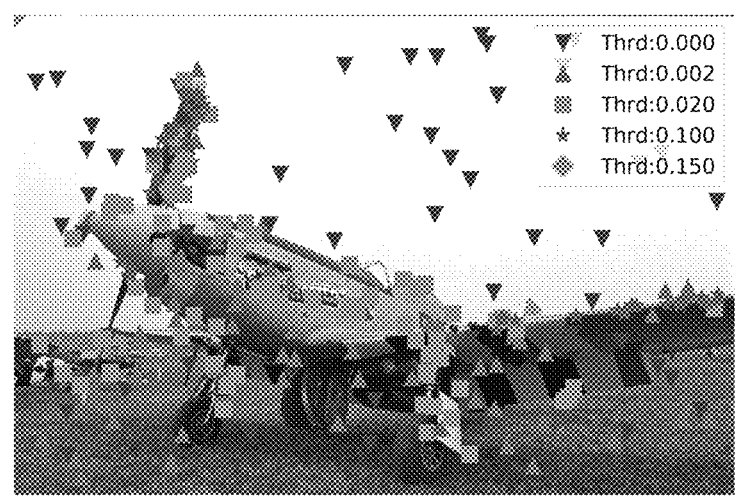
FIG. 4 depicts variance threshold-based patch sampling examples for different threshold values.

FIG. 4 shows the sampling results based on different variance threshold in the experiment. Each point in the figure represents the center point of the image patches. The different shapes of the points represent the result of different variance thresholds. The triangles represent no variance threshold was set. It can be observed that the patches are uniformly distributed and many image patches come from homogenous regions. When the variance threshold value increases, the sampled patches tend to cluster on non-homogenous regions which are edge or texture areas. However, for large variance threshold values, image patches will be concentrated in a special region such as shown by the star and diamond shaped points. To select only these very high variance regions may ruin the CNN model performance as the training image patches from only limited areas will be selected and much information may be lost during the sampling process. Thus, a lower variance threshold value will be chosen.

In one embodiment, the method for image quality assessment using a trained neural network comprises: inputting the image; extracting one or more image patches from input images; measuring the variance of the extracted image patches; deciding to accept or decline the extracted image patches according to the measured variance and the position of extracted image patches; repeating the process until sufficient extracted image patches are accepted, with adjusted settings if necessary; determining one or more weights of the accepted image patches according to the measured variance value; Inputting the selected image patches into trained neural network and obtain the image quality score for the image patches; calculating the image score according to the image patch scores and the corresponding weights.

While training neural networks without using unreliable data from homogenous regions, the use of homogenous patches from the tested image is also avoided for quality score estimation. However, this may not be as straightforward as simply using the same variance threshold $T_{var}$ as was used to generate patches from the tested image. This is because sufficient patches may not be obtained from some tested images having a large portion of homogenous regions using a fixed sampling stride to scan the image for generating the test patches. As a result, an adaptive stride method is proposed for generating the test patches with use of an initial stride ($S_{init}$) and a minimum of number of test patches ($N_{min}$). That is, initially the tested image is scanned with the initial stride to generate n patches from the tested image based on the same $T_{var}$ that are used in the neural network training. Following this initially scanning, it is determined whether n is large enough for quality estimation. If n is greater or equal to $N_{min}$, then the quality score estimation begins using these n patches. However, if n is lower than $N_{min}$, the tested image may be scanned again with stride reduced by half such that more patches are generated from the tested image. This patch generation process may be repeated until n is greater than or equal to $N_{min}$ or the stride is reduced to 1. With appropriate selection of the parameters $T_{var}$, $S_{init}$, $N_{min}$, it is always possible to generate sufficient patches for quality score calculation. This is due to the fact that most real-world images include sufficient portions of non-homogenous regions for quality evaluation.

Besides avoiding homogenous patches for quality score estimation, the invention may also bias towards predicted scores of patches with higher variances based on the prediction error property as shown in FIG. 3. This is because high-variance patches are more robust with relatively lower prediction errors. Thus, a patch variance weighted average for calculating the final image quality score may be used. For n non-homogeneous patches $\{P_1, P_2, \ldots, P_N\}$ that are obtained from the tested image using the adaptive stride patch generation, the overall image quality score Q is calculated by $$Q = \frac{\sum_{j=1}^{n} Q_j var_{ave}(P_j)}{\sum_{j=1}^{n} var_{ave}(P_j)}$$

where $Q_j$ and $var_{ave}(P_j)$ are predicted quality score and patch variance of $P_j$, respectively. This simple weighted average can make the final quality score bias to the predicted scores of the patches with higher variances. This can improve the robustness of CNN-based NR-IQA.

A CNN-based NR-IQA network as shown in FIG. 1 was implemented using Keras with TensorFlow as backend with test images from the LIVE database. The LIVE database includes 808 images and 80% of the images were randomly chosen to construct the training set and the remaining 20% for the test set. The convolutional neural network of FIG. 1 is trained based on the patch sampling strategy set forth above with 1500 epochs. In NR-IQA, the performance is evaluated by how well the quality score correlates with subjective test results, therefore, LCC (Linear Correlation Coefficient) and SROCC (Spearman Rank Order Correlation Coefficient) are used as the performance metrics. First it is determined how the variance threshold and minimum number of test patches affect the quality score estimation for parameter selection based on the training dataset. The training set is assumed to represent the real-world image characteristics. Afterwards, the test set is used to evaluate the performance of the invention compared with other well-known methods.

Figure 5:
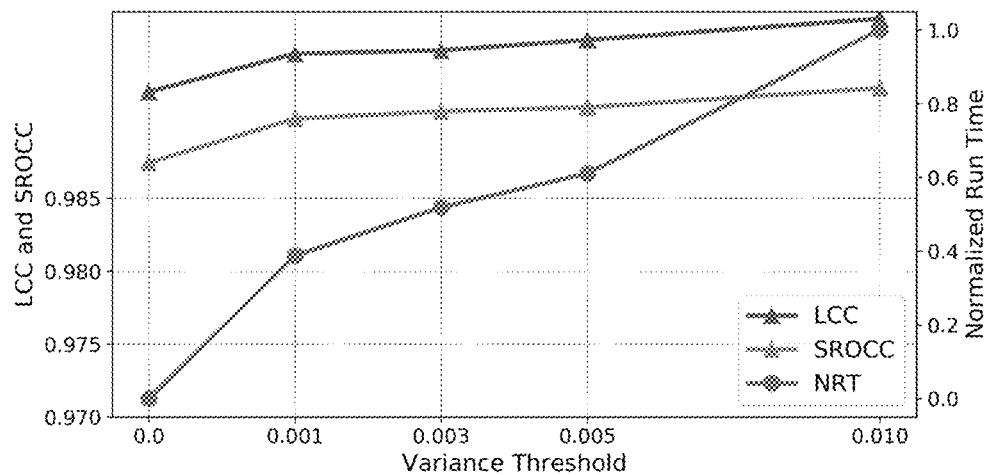
FIG. 5 shoes LCC, SROCC, and NRT of the quality score estimation vs. different patch variance thresholds.

The patch variance threshold ($T_{var}$) is an important parameter of the inventive method, which determines complexity of the non-homogenous patches for neural network training and quality score estimation. It is first determined how this parameter affects the quality score estimation performance in terms of LCC, SROCC and computational time for score estimation. These results are illustrated in FIG. 5 with $T_{var}$ in the range of 0.0 to 0.010. The curves of LCC and SROCC are the highest values for various settings with only $T_{var}$ being fixed. The trend of these two curves shows that LCC and SROCC are both improving with higher $T_{var}$ but the improvement is becoming insignificant for $T_{var}$ greater than 0.001. This aligns with the observation that homogenous patches with very low patch variances are unreliable, causing higher prediction errors. Thus, a very low value of $T_{var}$ cannot be used as too small a $T_{var}$ cannot filter out homogenous patches. Based on this observation, $T_{var}$ is selected to be higher than 0.001. However, too high a value of $T_{var}$ will filter out too many patches as some of the useful non-homogenous patches might be removed. Another drawback of large variance threshold is the higher computational requirement for the score estimation process. It is because higher $T_{var}$ leads to denser patch sampling (small stride) in order to obtain a sufficient number of patches for the score estimation. The normalized run time (NRT) of quality score estimation against different $T_{var}$ are also shown in FIG. 5, which demonstrates that a significant increase of NRT occurs with $T_{var}$ higher than 0.005. Based on these results, 0.005 is chosen for the parameter selection of $T_{var}$. However, it is understood that other values of $T_{var}$ may be selected depending on the image set selected for patch sampling and other system factors.

Figure 6:
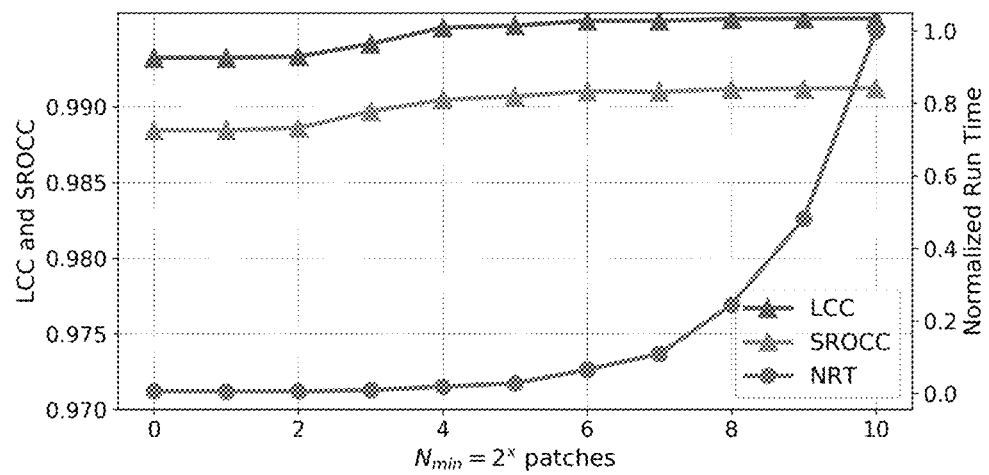
FIG. 6 shows LCC, SROCC, and normalized run times of the quality score estimation vs. different numbers of $N_{min}$ image patches.

Another important parameter is the minimum number of test patches ($N_{min}$). Too few test patches will cause unreliable quality score estimation, while too many test patches will significantly increase the computational requirement. Thus, we also analyzed how $N_{min}$ affects the quality score estimation performance in terms of LCC, SROCC and computational time for quality score estimation. These results are illustrated in FIG. 6 with $N_{min}$ from 1 to 1024, in which $N_{min}=2^x$. Based on the curves of LCC and SROCC, it is found that higher $N_{min}$ always achieve better accuracy, but the improvements are becoming less significant for $N_{min}$ larger than 64 (=$2^6$). However, the quality score estimation run times also increase with $N_{min}$, especially for $N_{min}$ larger than 128 (=$2^7$). To achieve reasonably low computational requirement as well as good accuracy, $N_{min}=128$ patches is selected as another main setting for the method of the present invention. However, it is understood that more or fewer patches may be selected depending upon the selected computational requirement and the desired accuracy.

To evaluate the method of the present invention in a non-distortion specific setting, five distortion types of the LIVE database were selected. The key parameters of the method are $T_{var}=0.005$, $N_{min}=128$ and $S_{init}=128$. Table 1 shows the experimental results in terms of LCC and SROCC for t five distortion types: JPEG2000 compression (JP2K); JPEG compression (JPEG); White Noise (WN); Gaussian blur (BLUR); and fast fading (FF). The inventive method is compared to an FR-IQA method of FSIM, two non-CNN-based NR-IQA methods (DIIVINE and CORNIA), and two state-of-the-art CNN-based NR-IQA methods (Kang and Pre-SM). The inventive method is evaluated based on images with one particular type of distortion. As shown in Table 1, the inventive method outperforms all these well-known methods except JPEG distortion with slightly lower than Kang and Pre-SM methods. Moreover, the present method achieves excellent results (greater than or equal to 0.99) for white noise distortion and outstanding performance on handling JP2K distortion. In addition, Table 2 lists and compares the inventive method with 3 popular FR-IQA methods (PSNR, SSIM and FSIM), 4 non-CNN-based NR-IQA methods (DIIVINE, BLIINDS-II, BRISQUE and CORNIA) and 8 CNN-based NR-IQA methods. The method of the present invention achieves the highest prediction accuracy in terms of both LCC and SROCC among all compared methods. These results demonstrate that removing homogenous patches and variance-based weighting for quality score estimation can significant improve the neural network-based NR-IQA performance.

TABLE 1

| LCC | JP2K | JPEG | WN | BLUR | FF | ALL |
|---|---|---|---|---|---|---|
| FSIM | 0.910 | 0.985 | 0.976 | 0.978 | 0.912 | 0.960 |
| DIIVINE | 0.922 | 0.921 | 0.988 | 0.923 | 0.888 | 0.917 |
| CORNIA | 0.951 | 0.965 | 0.987 | 0.968 | 0.917 | 0.935 |
| Kang | 0.953 | 0.981 | 0.984 | 0.953 | 0.933 | 0.953 |
| Pre-SM | 0.979 | 0.986 | 0.986 | 0.917 | 0.914 | 0.978 |
| Proposed | 0.990 | 0.985 | 0.992 | 0.989 | 0.964 | 0.987 |

| SROCC | JP2K | JPEG | WN | BLUR | FF | ALL |
|---|---|---|---|---|---|---|
| FSIM | 0.970 | 0.981 | 0.967 | 0.972 | 0.949 | 0.964 |
| DIIVINE | 0.913 | 0.910 | 0.984 | 0.921 | 0.863 | 0.916 |
| CORNIA | 0.943 | 0.955 | 0.976 | 0.969 | 0.906 | 0.942 |
| Kang | 0.952 | 0.977 | 0.978 | 0.962 | 0.908 | 0.956 |
| Pre-SM | 0.969 | 0.974 | 0.978 | 0.956 | 0.883 | 0.974 |
| Proposed | 0.973 | 0.968 | 0.990 | 0.964 | 0.920 | 0.976 |

TABLE 2

| Methods | LCC | SROCC |
|---|---|---|
| PSNR | 0.868 | 0.873 |
| SSIM | 0.913 | 0.906 |
| FSIM | 0.960 | 0.964 |
| DIIVINE | 0.916 | 0.917 |
| BLIINDS-II | 0.930 | 0.931 |
| BRISQUE | 0.940 | 0.942 |
| CORNIA | 0.942 | 0.935 |
| Kang | 0.953 | 0.956 |
| Li | 0.956 | 0.935 |
| VeNICE | 0.960 | 0.950 |
| Sun | 0.958 | 0.959 |
| Bosse | 0.972 | 0.960 |
| Pan | 0.969 | 0.968 |
| Zuo | 0.967 | 0.964 |
| Pre-SM | 0.978 | 0.974 |
| Proposed | 0.987 | 0.976 |

As demonstrated above, for CNN-based NR-IQA neural networks, small image patches with very low patch variances are not reliable for training and final quality score estimation. In addition, image patches with high variances have a much higher chance of achieving better prediction accuracy. Based on this new observation, with the present invention uses a low patch variance threshold for avoiding homogenous patches in both neural network training and quality score estimation. To bias the score to test patches with higher variances, a variance-based weighting average may also be used to calculate the final image quality score. Test results demonstrated that this new patch variance biased approach can achieve state-of-the-art results on the LIVE database for NR-IQA. Further, the new observation of the prediction error characteristic with use of patch variance as a homogeneity indicator may be used in other neural network-based NR-IQA methods. That is, it is possible to make use of this characteristic in many different ways to improve the neural network training process as well as the final image quality score calculation.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

The invention claimed is:

1. A method for image patch selection for training a neural network for image quality assessment, comprising:
   a) receiving an input image;
   b) extracting one or more image patches from the input image;
   c) measuring a moment of the extracted image patches;
   d) deciding to accept or decline the extracted image patches according to a selection matrix, wherein the selection matrix comprises the measured moment;
   e) extracting additional image patches until a minimum number, $N_{min}$, of extracted image patches are accepted, or reconfiguring the selection matrix until the minimum number of extracted image patches are accepted;
   wherein the moment of the extracted image patches is of the second order, the variance of the image patches; and
   wherein the image patch variance is expressed as a weighted average pixel value variance of three channels in an image patch, according to:

$$\text{var}_{ave}(P)=[w_1*\text{var}_1(P)+w_2*\text{var}_2(P)+w_3*\text{var}_3(P)]/(w_1+w_2+w_3),$$

where $\text{var}_{ave}(P)$ is the image patch variance, P is pixel value, $\text{var}_1(P)$, $\text{var}_2(P)$ and $\text{var}_3(P)$ are pixel value variances of the three channels respectively, and $w_1$, $w_2$, $w_3$ are weights of the three channels respectively.

2. The method for image patch selection for training a neural network for image quality assessment according to claim 1, wherein the image patches are extracted from random locations in the input image.

3. The method for image patch selection for training a neural network for image quality assessment according to claim 1, wherein the image patches are extracted from pre-defined locations in the input image.

4. The method for image patch selection for training a neural network for image quality assessment according to claim 1, wherein the measured moment of each accepted image patch is greater than a threshold moment value, $T_{var}$.

5. The method for image patch selection for training a neural network for image quality assessment according to claim 4, wherein $T_{var}$ is selected to be 0.005 when pixel value is normalized to 1.

6. The method for image patch selection for training a neural network for image quality assessment of image quality according to claim 4, wherein $T_{var}$ is a variable.

7. The method for image patch selection for training a neural network for image quality assessment of image quality according to claim 1, wherein $N_{min}$ is selected to be 32.

8. The method for image patch selection for training a neural network for image quality assessment according to claim 1, wherein $N_{min}$ is a variable.

9. The method for image patch selection for training a neural network for image quality assessment according to claim 1, wherein the neural network is a convolutional neural network.

10. A method for image quality assessment using a trained neural network, comprising:
    receiving an input image;
    selecting image patches from the input image for assessment, comprising:
    a) extracting one or more image patches from the input image;
    b) measuring a moment and position of the extracted image patches;
    c) deciding to accept or decline the extracted image patches according to a selection matrix, wherein the selection matrix includes the measured moment and the position of extracted image patches;
    d) extracting additional image patches until a minimum number, $N_{min}$, of extracted image patches are accepted, or reconfiguring the selection matrix until the minimum number of extracted image patches are accepted;
    e) determining one or more weights of the accepted image patches according to the measured moment;
    inputting into a neural network the selected image patches to obtain the image quality values of the selected image patches;
    calculating the image quality value of the input image according to the image quality values of the selected image patches and the corresponding weights.

11. The method for image quality assessment using a trained neural network according to claim 10, wherein the image patches are extracted from random locations in the input image.

12. The method for image quality assessment using a trained neural network according to claim 10, wherein the image patches are extracted from pre-defined locations in the input image.

13. The method for image quality assessment using a trained neural network according to claim 10, wherein the moment of the extracted image patches is of the second order, the variance of the image patches.

14. The method for image quality assessment using a trained neural network according to claim 13, wherein the image patch variance is expressed as a weighted average pixel value variance of the three channels in an image patch, according to:

$$\text{var}_{ave}(P)=[w_1*\text{var}_1(P)+w_2*\text{var}_2(P)+w_3*\text{var}_3(P)]/(w_1+w_2+w_3),$$

where $\text{var}_{ave}(P)$ is the image patch variance, P is pixel value, $\text{var}_1(P)$, $\text{var}_2(P)$ and $\text{var}_3(P)$ are pixel value variances of the three channels respectively, and $w_1$, $w_2$, $w_3$ are weights of the three channels respectively.

15. The method for image quality assessment using a trained neural network according to claim 10, wherein the image patch selection process is completed if the following conditions are met:
    a) the measured moment of each accepted image patch is greater than a threshold moment value, $T_{var}$;

b) the number of selected image patches is greater than or equal to a predefined minimum number of test patches, $N_{min}$.

16. The method for image quality assessment using a trained neural network according to claim 15, wherein reconfiguring the selection matrix includes:
    a) selecting an initial stride as an initial distance $S_{init}$ for extracting test patches from an input image;
    b) scanning the image with the initial stride to generate N image patches based on the threshold variance $T_{var}$;
    c) if N is less than $N_{min}$, repeat the scanning with a reduced stride value until N is greater than or equal to $N_{min}$ or stride value is equal to 1.

17. The method for image quality assessment according to claim 10, wherein the quality score Q is determined for n selected image patches $\{P_1, P_2, \ldots, P_N\}$ by:

$$Q = \frac{\sum_{j=1}^{n} Q_j \text{var}_{ave}(P_j)}{\sum_{j=1}^{n} \text{var}_{ave}(P_j)}$$

where $Q_j$ and $\text{var}_{ave}(P_j)$ are predicted quality score and patch variance of $P_j$, respectively.

18. A method for image patch selection for training a neural network for image quality assessment, comprising:
    a) receiving an input image;
    b) extracting one or more image patches from the input image;
    c) measuring a moment of the extracted image patches;
    d) deciding to accept or decline the extracted image patches according to a selection matrix, wherein the selection matrix comprises the measured moment;
    e) extracting additional image patches until a minimum number, $N_{min}$, of extracted image patches are accepted, or reconfiguring the selection matrix until the minimum number of extracted image patches are accepted;
        wherein the measured moment of each accepted image patch is greater than a threshold moment value, $T_{var}$; and $T_{var}$ is selected to be 0.005 when pixel value is normalized to 1.

19. The method for image patch selection for training a neural network for image quality assessment according to claim 18, wherein $N_{min}$ is selected to be 32.

* * * * *